US006867691B2

United States Patent
Nishimura (10) Patent No.: US 6,867,691 B2
(45) Date of Patent: Mar. 15, 2005

(54) KNOCK DETERMINING APPARATUS FOR INTERNAL COMBUSTION ENGINE

(75) Inventor: Junya Nishimura, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 246 days.

(21) Appl. No.: 10/162,080

(22) Filed: Jun. 5, 2002

(65) Prior Publication Data

US 2003/0005749 A1 Jan. 9, 2003

(30) Foreign Application Priority Data

Jun. 6, 2001 (JP) .................................. 2001-171263

(51) Int. Cl.[7] ............................................... B60Q 1/00
(52) U.S. Cl. ................... 340/439; 340/426.3; 340/441; 340/566
(58) Field of Search ................ 340/439, 441, 340/426.3, 566; 73/35.01, 35.09, 35.11, 649, 651, 35.04, 35.13

(56) References Cited

U.S. PATENT DOCUMENTS

| | | | | |
|---|---|---|---|---|
| 4,625,692 A | * | 12/1986 | Kashimura et al. | 123/406.21 |
| 5,230,316 A | * | 7/1993 | Ichihara et al. | 123/406.38 |
| 5,522,254 A | * | 6/1996 | Kamabora et al. | 73/35.05 |
| 5,608,633 A | * | 3/1997 | Okada et al. | 73/35.09 |
| 5,996,398 A | * | 12/1999 | Schleupen et al. | 73/35.05 |
| 6,000,276 A | * | 12/1999 | Mogi et al. | 73/35.08 |
| 6,112,577 A | * | 9/2000 | Kawajiri et al. | 73/35.11 |

FOREIGN PATENT DOCUMENTS

| | | |
|---|---|---|
| JP | A 8-177697 | 7/1996 |
| JP | A 9-112333 | 4/1997 |
| JP | A 11-107844 | 4/1999 |

* cited by examiner

*Primary Examiner*—Jeffery Hofsass
*Assistant Examiner*—Daniel Previl
(74) *Attorney, Agent, or Firm*—Oliff & Berridge, PLC (57) ABSTRACT

The detection output of a knock sensor, which detects knock of an internal combustion engine, is filtered by a filter in which the filtering frequency band is variable. The output of the filter is discriminated by a level discriminating unit with respect to a given determination level. A counter counts number c of times at which the detection output of the knock sensor is equal to or higher than the determination level. A determining unit determines whether knock occurs or not on the basis of the number c. In response to the output of the determining unit, when determination of occurrence of knock is impossible, a correcting unit conducts correction of shifting the filtering frequency band of the filter. Therefore, determination of occurrence of knock is enabled, and the accuracy of knock detection is improved.

9 Claims, 7 Drawing Sheets

FIG. 8 ically used in, for example, control of an ignition timing of an internal combustion engine.

KNOCK DETERMINING APPARATUS FOR INTERNAL COMBUSTION ENGINE

The present disclosure related to the subject matter contained in Japanese Patent Application No.2001-171263 filed on Jun. 6, 2001, which is incorporated herein by reference in its entirety.

BACKGROUND OF THE INVENTION

1. Field of the Invention

The present invention relates to a knock determining apparatus, which is suitably used in, for example, control of an ignition timing of an internal combustion engine.

2. Description of the Related Art

In a spark ignition internal combustion engine, a higher output can be obtained as the compression ratio of the air-fuel mixture is higher. When the compression ratio is high, however, so-called knock often occurs in which, after the air-fuel mixture introduced into a cylinder is ignited by a spark, an unburned gas explodes in advance of a flame propagating in the cylinder. When knock occurs in an internal combustion engine, pressures applied to the pistons become uneven to make the operation of the engine irregular, and the temperature of the engine is raised to lower the thermal efficiency, with the result that the engine power is lowered. In an internal combustion engine, therefore, it is determined whether knock occurs or not, and, if knock occurs, a control of adjusting, for example, the ignition timing is conducted to suppress occurrence of knock.

In an internal combustion engine, a method is employed in which a knock sensor configured by a piezoelectric device or the like is disposed in each of cylinders and occurrence of knock is determined on the basis of the detection output of the knock sensor. When the spectrum of the detection output of a knock sensor is sampled, it is seen that the output level when knock occurs is larger than that when knock does not occur. The difference between the output level when knock occurs, and that when knock does not occur is not uniform over the entire frequency range of the detection output of the knock sensor, but conspicuously appears at a specific frequency. The frequency at which the output level difference conspicuously appears is called the resonance frequency.

A knock sensor in which the detection range is limited to the resonance frequency band where the output level difference is large is a resonance knock sensor. In a resonance knock sensor, the specific resonance frequency is previously decided by setting the sensor itself. Specifically, the resonance frequency is set to a frequency band in which it is estimated that the output level difference is large in a substantially common manner while sacrificing the characteristics and the S/N ratio that depend on cylinders of an internal combustion engine and conditions such as the rotational speed.

Figure 8:
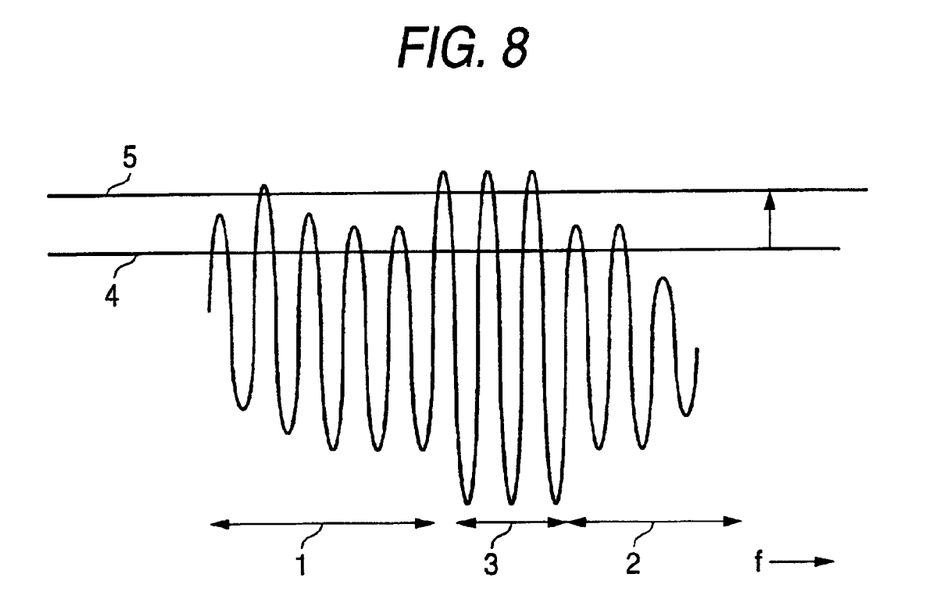
FIG. 8 is a view diagrammatically showing determination of occurrence of knock in the related art.

FIG. 8 diagrammatically shows determination of occurrence of knock in the related art. In the determination of occurrence of knock in the related art, if the detection output of a knock sensor reaches one or more times the determination level, it is determined that knock occurs. In an internal combustion engine, in addition to vibrations due to knock, also vibrations due to the ignition timings of ignition plugs and seat timings of inlet/outlet and exhaust valves occur. Detection outputs of a knock sensor, which are produced vibrations due to a cause other than knock, are called background noises 1 and 2. When the frequency of a knock signal 3 which is the detection output of the knock sensor produced by vibrations due to knock is close to the frequencies of the background noises 1 and 2, also the background noises 1 and 2 are sometimes detected with being included together with the knock signal 3 in the resonance frequency band which is set in a resonance knock sensor.

In the case where both the knock signal 3 and the background noises 1 and 2 exist in the resonance frequency band, in the related art, discrimination of the knock signal 3 from the background noises 1 and 2 is enabled by raising the determination level from a first determination level 4 to a second determination level 5, and occurrence of knock is then determined.

In the technique in which the determination level is simply changed, when the intensities of the background noises 1 and 2 are so high that the intensity difference between the knock signal 3 and the background noises 1 and 2 is small, it is difficult to discriminate the knock signal 3 from the background noises 1 and 2. Hence, there is a problem in that occurrence of knock cannot be accurately determined.

In a related art example shown in FIG. 8, it is determined that knock occurs based on the detection output of the knock sensor, which reaches the second determination level 5 and is in the state where the output contains not only the knock signal 3 but also the background noise 1. Although not illustrated, there may be a case where it is determined that knock occurs, notwithstanding that the detection output, which reaches the determination level, contains only background noises.

Namely, even when it is difficult to discriminate the knock signal from the background noises and determination is actually impossible, if the detection output of the knock sensor reaches one or more times the determination level, it is always determined that knock occurs. Therefore, the related art example is not a knock determining method, which is always accurate.

One of reasons why the frequency of the knock signal and frequencies of background noises are close to one another to exist together in the resonance frequency band is that the frequency of the knock signal is varied by changes with time or the like in the operation of an internal combustion engine. In this case, in accordance with variation of the frequency of the knock signal, the resonance frequency band which is set in the knock sensor is corrected so as to be shifted, whereby the accuracy of detection of the knock signal in the detection output of the knock sensor can be improved.

The related art technique of shifting the resonance frequency band is disclosed in, for example, JP-A-Hei.8-177697. In the related art technique, a flat sensor in which the detecting frequency is not fixed to a specific frequency is used as a knock sensor, and the setting of the flat sensor itself can be changed depending on the kind of the internal combustion engine, the rotational speed, and the cylinder. Flat sensors can be set so as to have different resonance frequencies, respectively. When the frequency of the knock signal is varied by changes with time or the like in the operation of an internal combustion engine to be deviated from the resonance frequency set in one of the flat sensors, the standard deviation in the intensity distribution of the detection output of the knock sensor is calculated, and the calculated standard deviation is compared with a given value. If the standard deviation is smaller than the given value, it is determined that the resonance frequency is deviated, and the accuracy of knock detection is improved by correcting the resonance frequency set in the flat sensor. In the related art technique, since deviation of the resonance frequency is determined on the basis of a result of the calculation of the standard deviation in the intensity distribution of the detection output of the knock sensor, there is a problem in that the operation of detecting deviation of the resonance frequency is very complicated.

It is an object of the invention to provide a knock determining apparatus for an internal combustion engine in which reduction of erroneous determination of occurrence of knock, and determination of deviation of the resonance frequency are performed by a simple determining unit, and the deviation of the resonance frequency is corrected on the basis of a result of the determination, whereby the accuracy of knock detection can be improved.

SUMMARY OF THE INVENTION

According to a first aspect of the invention, there is provided a knock determining apparatus for an internal combustion engine, having a knock sensor for detecting knock in the internal combustion engine, a crank angle sensor for detecting a rotational angular position of a crank disposed in the internal combustion engine, a filter in which a filtering frequency band is variable, the filter for filtering a detection output of the knock sensor, a level discriminating unit for discriminating an output of the filter with respect to a given determination level in response to the output of the filter, a counter for counting number c of times at which the detection output of the knock sensor is not lower than the determination level in response to an output of the level discriminating unit, a determining unit for determining whether knock occurs or not on a basis of the counted number c in response to an output of the counter, and a correcting unit, in response to an output of said determining unit, for shifting the filtering frequency band of the filter when it is determined that determination of occurrence of knock is impossible.

According to the invention, the determining unit determines deviation of the resonance frequency of knock on the basis of the number c, which is counted number of detection outputs of the knock sensor that are equal to or higher than the given determination level. The correcting unit conducts correction of shifting the filtering frequency band of the filter in response to the output of the determining unit. According to the configuration, deviation of the resonance frequency can be determined by the simple configuration and correction of the filtering frequency band of the filter can be conducted by shifting the band so as to conform to the resonance frequency of knock. Therefore, the accuracy of knock detection can be improved.

In the invention, when the number c counted by the counter is not lower than a given first value x1, the determining unit determines that determination of occurrence of knock is impossible. When the number c is not higher than a given second value x2, the determining unit determines that knock does not occur.

According to the invention, the determining unit determines whether knock occurs or not, or whether determination of occurrence of knock is impossible or not, on the basis of a result of the comparison of whether the number c counted by the counter is equal to or larger than the given value x1 or not, or a result of the comparison of whether the number is equal to or smaller than the given value x2 or not. According to the configuration, occurrence of knock and deviation of the resonance frequency can be determined by the simple configuration, and erroneous determination of occurrence of knock can be reduced. Therefore, the control of suppressing knock can be conducted more accurately.

In the invention, the knock determining apparatus further has a first memory for storing step number at which the filtering frequency band of the filter is stepwise shifted to enable determination of occurrence of knock in response to an output of the correcting unit, a calculating unit for calculating a sum of the step numbers stored in the first memory and average step number by dividing the sum of step numbers by a number of occasions where the correcting operation of stepwise shifting the filtering frequency band of the filter is performed on a basis of determination that determination of occurrence of knock is impossible, a second memory for storing the average step number, which is a calculation result, in response to an output of the calculating unit, and a wide correcting unit for performing a one-stroke shifting of steps, which is decided by the average step number read out from the second memory, in response to the output of the determining unit, when it is determined that determination of occurrence of knock is impossible and the average step number is stored in the second memory. In addition, the correcting unit stepwise shifts the filtering frequency band of the filter.

According to the invention, since the wide correcting unit can conduct the correction of performing the one-stroke shifting of steps which are decided by the average step number, and by which the filtering frequency band of the filter is to be shifted, the time period required for the correction of the filtering frequency band can be shortened, and occurrence of knock can be rapidly determined.

In the invention, the second memory stores the average step number for each of cylinders of the internal combustion engine and for each of rotational speeds of the internal combustion-engine.

According to the invention, the average step number is stored in the second memory for each of cylinders of the internal combustion engine, and for each of rotational speeds of the internal combustion engine. According to the configuration, for any one of cylinders of the internal combustion engine, and in a state where the rotational speed of the internal combustion engine is changed, the wide correcting unit can conduct the correction of performing the one-stroke shifting of steps which are decided by the average step number, and by which the filtering frequency band of the filter is to be shifted. Therefore, the time period required for the correction of the filtering frequency band can be further shortened.

DESCRIPTION OF THE RELATED ART

Figure 1:
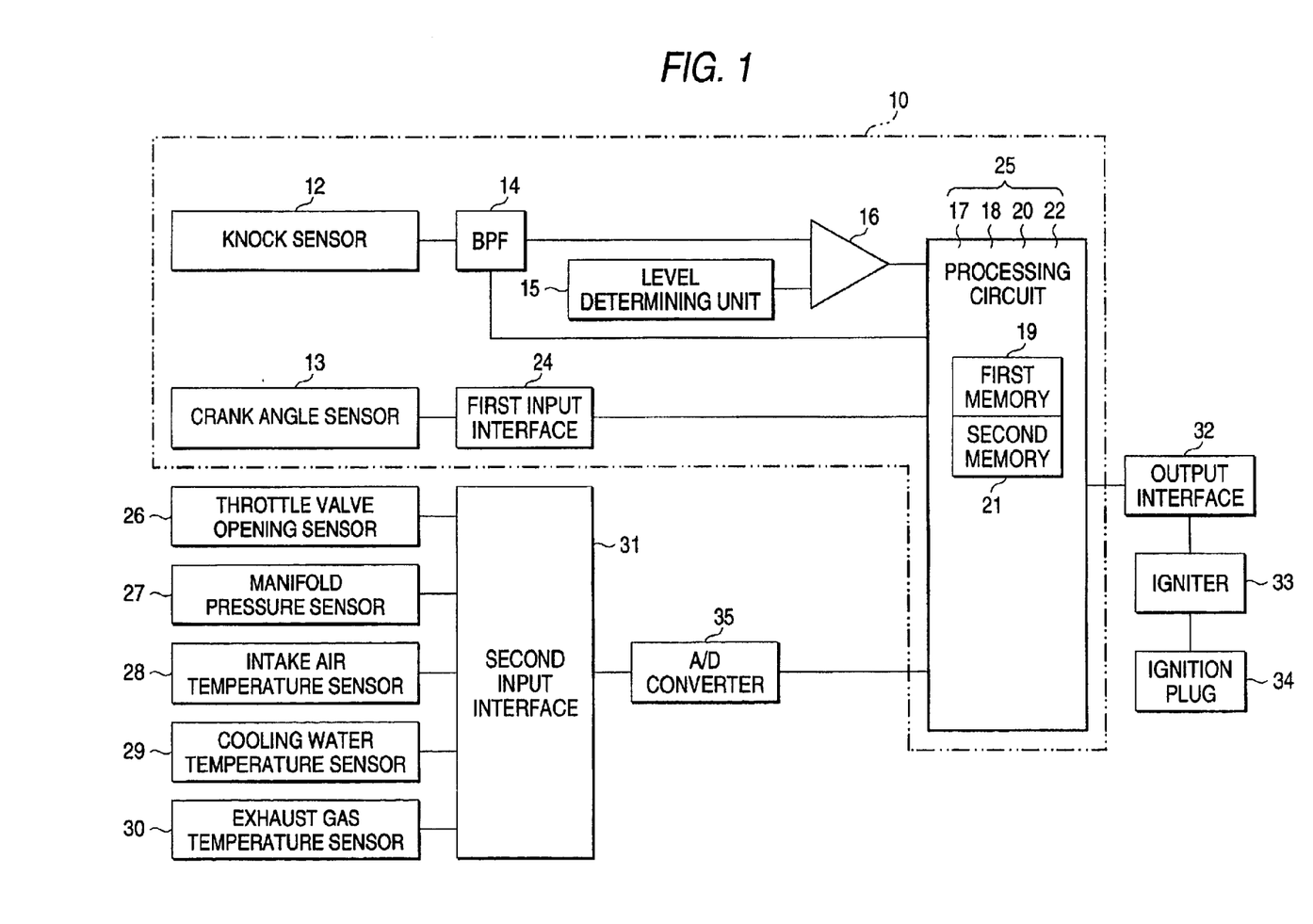
FIG. 1 is a block diagram showing, in a simplified manner, configuration of a knock determining apparatus for an internal combustion engine according to an embodiment of the invention.
Figure 2:
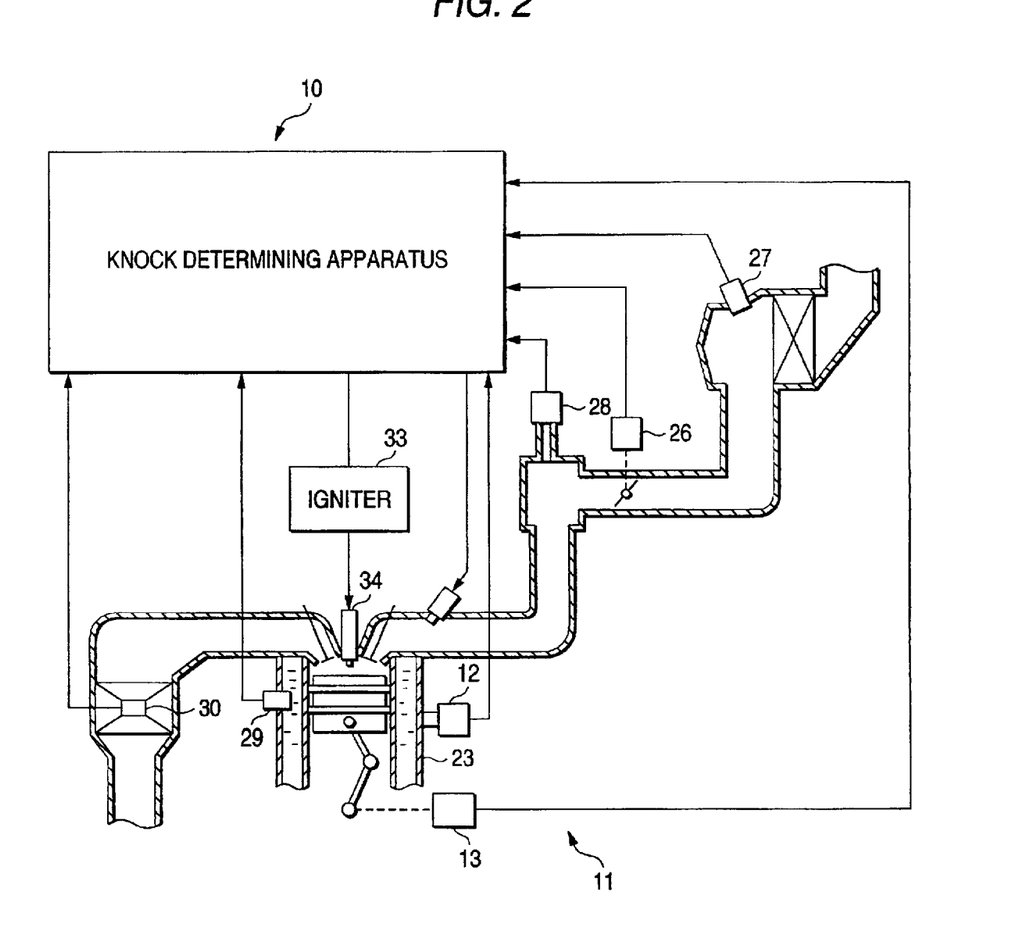
FIG. 2 is a system diagram showing, in a simplified manner, the configuration of an internal combustion engine comprising the knock determining apparatus for the internal combustion engine shown in FIG. 1.

FIG. 1 is a block diagram showing, in a simplified manner, configuration of a knock determining apparatus 10 for an internal combustion engine according to an embodiment of the invention. FIG. 2 is a system diagram showing, in a simplified manner, configuration of an internal combustion engine 11 having the knock determining apparatus for the internal combustion engine shown in FIG. 1.

The knock determining apparatus 10 for an internal combustion engine (hereinafter, referred to merely as the knock determining apparatus) includes a knock sensor 12, a crank angle sensor 13, a filter 14, a level discriminating unit 15, a counter 16, a determining unit 17, a correcting unit 18, a first memory 19, a calculating unit 20, a second memory 21, and a wide correcting unit 22. The knock sensor 12 detects knock in the internal combustion engine 11. The crank angle sensor 13 detects rotational angular position of a crank of the internal combustion engine 11. The filter 14 filters a detection output of the knock sensor 12, in which filtering frequency band is variable. The level discriminating unit 15 discriminates an output of the filter 14 with respect to a given determination level in response to an output of the filter 14. The counter 16 counts number c of times at which the detection output of the knock sensor 12 is equal to or higher than the determination level in response to an output of the level discriminating unit 15. The determining unit 17 determines whether knock occurs or not on the basis of the counted number c in response to an output of the counter 16. The correcting unit 18 shifts the filtering frequency band of the filter in response to an output of the determining unit 17, when it is determined that determination of occurrence of knock is impossible. The first memory 19 stores a step number at which the filtering frequency band of the filter 14 is stepwise shifted to enable determination of occurrence of knock, in response to an output of the correcting unit 18.

The calculating unit 20 calculates a sum of step numbers that are stored in the first memory 19 and average step number by dividing the sum of step numbers by number of occasions where the correcting operation of stepwise shifting the filtering frequency band of the filter 14 is performed on the basis of determination that determination of occurrence of knock is impossible. The second memory 21 stores the average step number that is the calculation result in response to an output of the calculating unit 20.

The wide correcting unit 22 performs a one-stroke shifting of steps, which are decided by the average step number read out from the second memory 21, in response to the output of the determining unit 17, when it is determined that determination of occurrence of knock is impossible and the average step number is stored in the second memory 21.

The knock sensor 12 is a sensor configured by, for example, a piezoelectric device, and fixed to a cylinder 23 of the internal combustion engine 11. The crank angle sensor 13 is a sensor, which detects the rotational angular position of the crank of the internal combustion engine 11 as described above. The detection output of the crank angle sensor 13 is supplied via a first input interface 24 to a processing circuit 25, which will be described later. An observation period is set in which, in response to a detection output of the crank angle sensor 13, the detection output of the knock sensor 12 is extracted during a cycle of the internal combustion engine 11 and observed in order to determine occurrence of knock.

In many cases, the observation time period is set in a period from a timing when the piston of the cylinder 23 reaches the first top dead center after ignition to a timing when the piston reaches the next top dead center.

The observation period can be realized by the following configuration. Although not illustrated, for example, a circuit having a gate switch is disposed. In response to the detection output of the crank angle sensor 13, conduction of the gate switch is started when the crank reaches a given crank angle. The detection output of the knock sensor 12 is extracted only during a period when the gate switch is conductive. When the angular displacement of the crank in a given crank angle range is attained, the gate switch is turned off.

Figure 3:
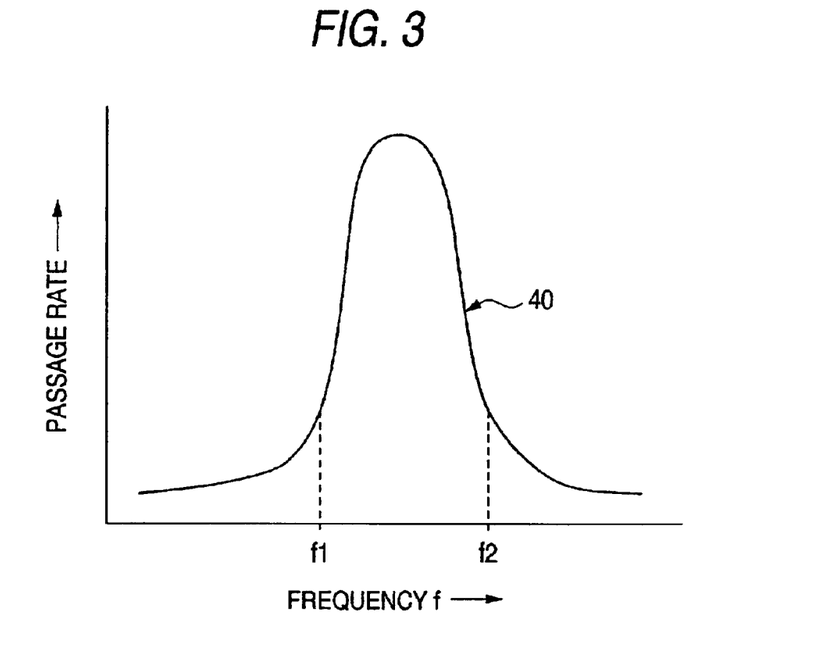
FIG. 3 is a view diagrammatically illustrating the frequency passage rate of a BPF 14.

The detection output of the knock sensor 12 which is extracted during the observation period is supplied to the filter 14. The filter 14 is a band pass filter, and hereinafter abbreviated as the BPF. FIG. 3 is a view diagrammatically illustrating frequency passage rate of the BPF 14. The BPF 14 is a filter having a feature that the passage rate of the frequency band defined by two cut-off frequencies f1 and f2 is high, but the passage rate of a frequency, which is lower than the cut-off frequency f1 or higher than the cut-off frequency f2, is low. The frequency range in which the passage rate is high, or which is not lower than f1 and not higher than f2 is called the filtering frequency band. In a range between the cut-off frequencies f1 and f2, therefore, a line 40 indicating the frequency passage rate has a convex shape. When the frequency is lower than the cut-off frequency f1 or higher than the cut-off frequency f2, the line 40 is largely attenuated. The filtering frequency band of the BPF 14 can be variably set.

The level discriminating unit 15 is a circuit, which sets the determination level for discriminating the detection output of the knock sensor 12, which has passed through the BPF 14. The determination level set in the level discriminating unit 15 is variable. The counter 16 is configured by a comparison circuit and compares the determination level set in the level discriminating unit 15 with the detection output of the knock sensor 12 which has passed through the BPF 14, to count the number c of times at which the detection output of the knock sensor 12 reaches the determination level. The number c counted by the counter 16 is supplied to the processing circuit 25.

The processing circuit 25, which functions also as the determining unit 17, the correcting unit 18, the calculating unit 20, and the wide correcting unit 22, is realized by, for example, a microcomputer configured by a CPU (Central Processing Unit), etc. The first and second memories 19 and 21 are configured by a RAM (Random Access Memory). Results of calculations by the calculating unit 20 and the like are at any time read from and written into the memories.

Sensors of other kinds, such as a throttle valve opening sensor 26, a manifold pressure sensor 27, an intake air temperature sensor 28, a cooling water temperature sensor 29, and an exhaust gas temperature sensor 30 are connected to the knock determining apparatus 10. Detection outputs of the sensors 26 to 30 are supplied to the processing circuit 25 of the knock determining apparatus 10, via a second input interface 31 and an A/D converter 35. The processing circuit 25 performs a knock control by supplying a knock control signal which is produced on the basis of the detection outputs of the sensors 26 to 30 and a knock detection output of the knock determining apparatus 10, to an igniter 33 via an output interface 32, and adjusting the ignition timing of an ignition plug 34 via the igniter 33.

Figure 4:
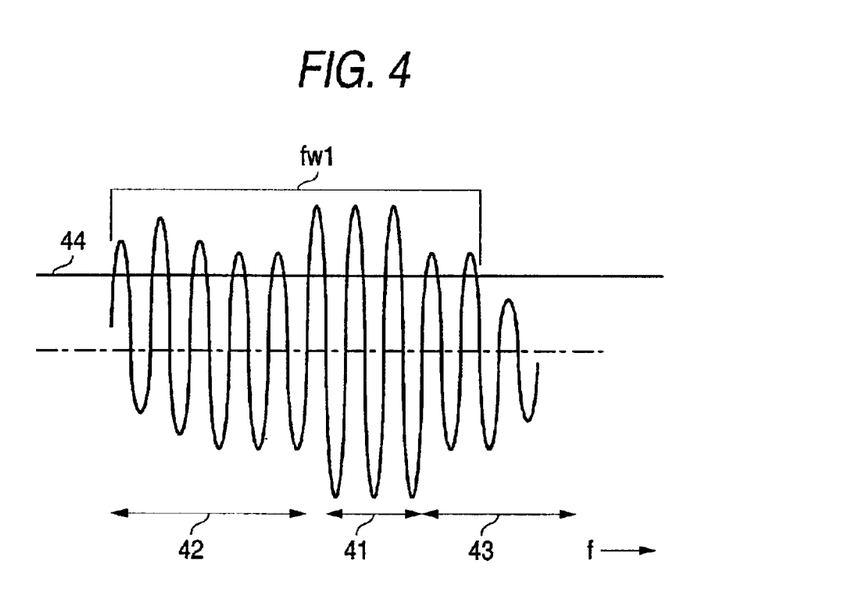
FIG. 4 is a view showing the detection output of a knock sensor 12 before deviation of the filtering frequency band of the BPF 14 is corrected.
Figure 5:
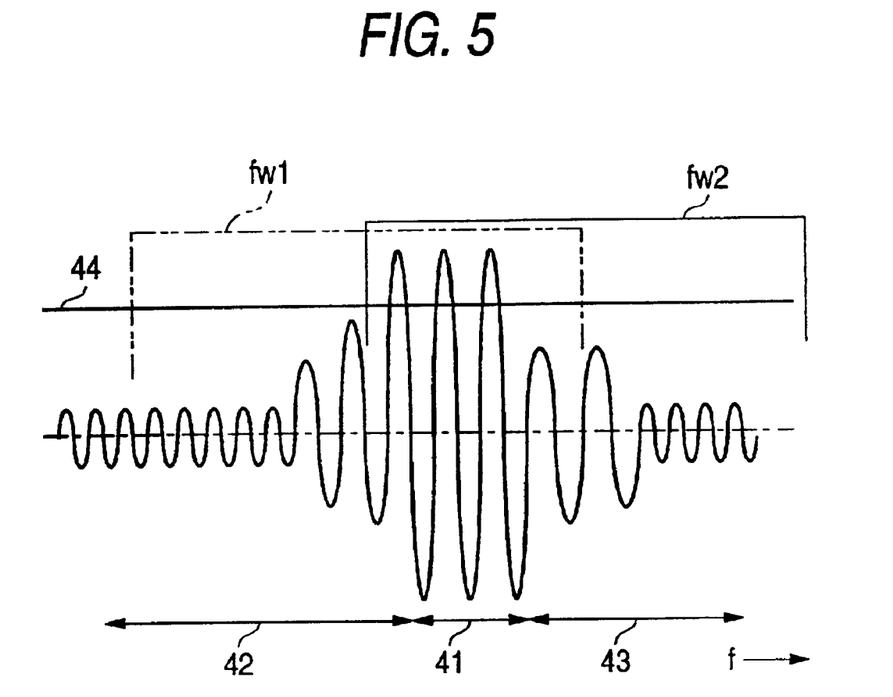
FIG. 5 is a view showing the detection output of the knock sensor 12 after deviation of the filtering frequency band of the BPF 14 corrected.

FIG. 4 is a view showing the detection output of the knock sensor 12 before deviation of the filtering frequency band of the BPF 14 is corrected. FIG. 5 is a view showing the detection output of the knock sensor 12 after deviation of the filtering frequency band of the BPF 14 is corrected.

Under a state where the internal combustion engine 11 is operated, in response to the output of the crank angle sensor 13, the observation period in which the detection output of the knock sensor 12 is extracted during one cycle of the internal combustion engine 11 is started when the crank reaches the given rotational angular position, and the observation period is ended when the crank passes through the given crank angle range. In the observation period, which is set as described above, vibrations of the cylinder 23 are detected by the knock sensor 12. With respect to the detection output of the knock sensor 12 which is configured by signals of a wide frequency range, a filtering frequency band fw1 is set by the BPF 14 so as to conform to the resonance frequency of knock. With respect to the detection output of the knock sensor 12, which is detected in the filtering frequency band fw1, a determination level 44 is set by the level discriminating unit 15. The number c of times at which the detection output of the knock sensor 12 reaches the determination level 44 is counted by the counter 16 configured by the comparison circuit. Then, the number c is supplied to the processing circuit 25. On the basis of the input number c, the determining unit 17 of the processing circuit 25 determines occurrence of knock.

For example, the determination of occurrence of knock can be realized by previously storing a determination criterion such as shown in Table 1 below into a ROM (Read Only Memory), which is not shown, reading the stored determination criterion from the ROM, and comparing the number c supplied from the counter 16 with the determination criterion. In other words, if the number c is equal to or larger than a given value x1 or, for example, five, it is determined that determination of occurrence of knock is impossible. If the number is equal to or smaller than a given value x2 or, for example, one, it is determined that knock does not occur. If the number is smaller than 5 and larger than 1, it is determined that knock occurs. In the example shown in FIG. 4, both a knock signal 3 and background noises 42 and 43 are included in the filtering frequency band fw1, and the number c of times at which the detection output exceeds the determination level 44 is counted ten times by the counter 16. Therefore, it is determined that determination of occurrence of knock is impossible.

In response to the output of the determining unit 17 that determination of occurrence of knock is impossible, the correcting unit 18 conducts a correction in which the filtering frequency band fw1 of the BPF 14 is stepwise shifted to a filtering frequency band fw2. As a result of the correction of shifting the filtering frequency band of the BPF 14 from fw1 to fw2, the background noise 42 is excluded from the filtering frequency band fw2. Frequency components, which are different from those before the correction, are detected with being included in the filtering frequency band fw2. Hence, the intensity of the background noise 42 is reduced so that determination of occurrence of knock is enabled. In the example shown in FIG. 5, the number c of times at which the detection output of the knock sensor 12 reaches the determination level 44 is three. Hence, the above-mentioned conditions that the number is larger than one and smaller than five is satisfied. Therefore, it is determined that knock occurs.

TABLE 1

| Number c of times at which detection output is not lower than determination level | determination |
| --- | --- |
| five or more | determination of knock is impossible |
| larger than one and smaller than five | knock occurs |
| 1 or less | knock does not occur |

Figure 6:
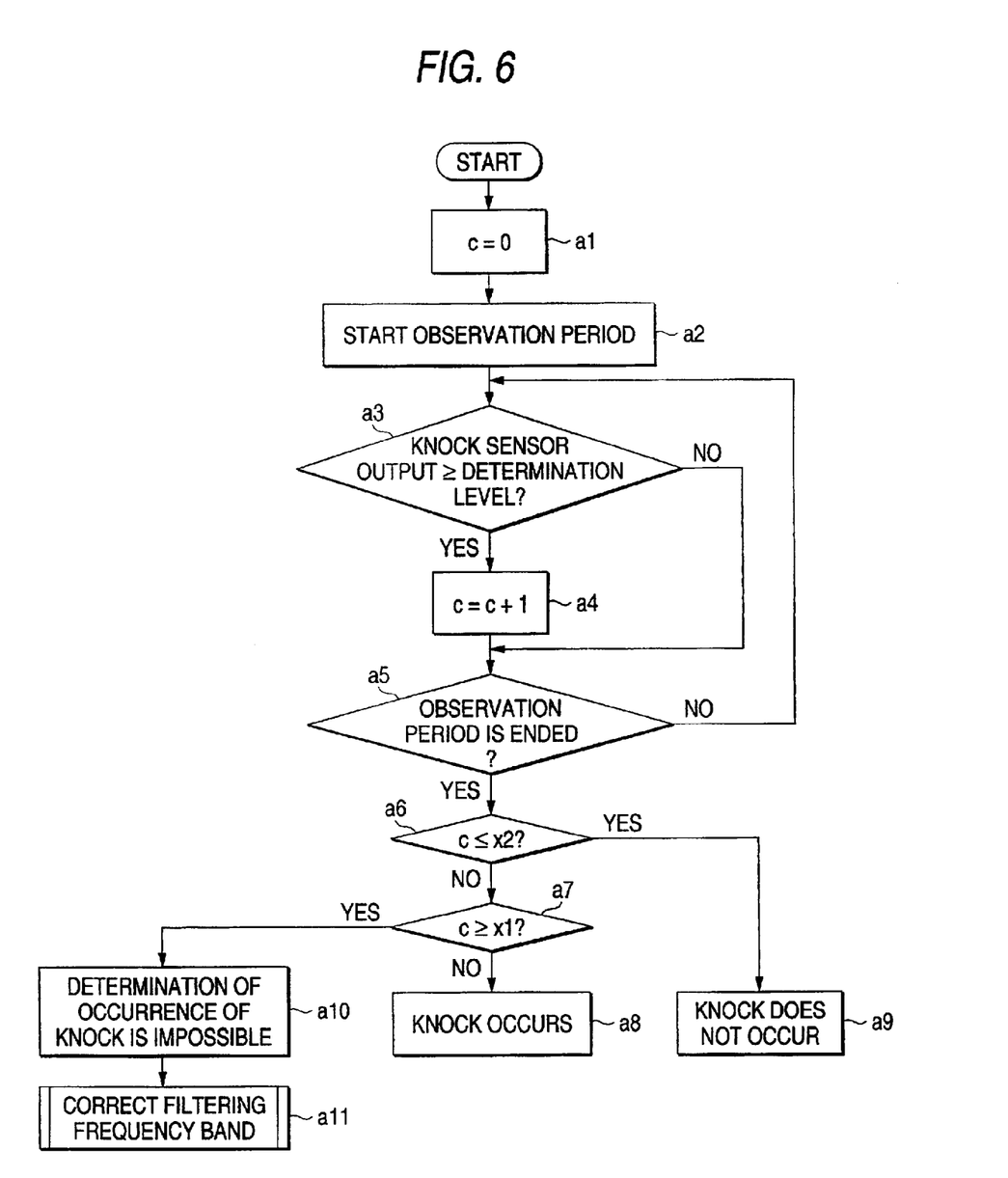
FIG. 6 is a flowchart showing an operation in which a determining unit 17 determines occurrence of knock.

FIG. 6 is a flowchart showing the operation in which the determining unit 17 determines occurrence of knock. With reference to the flowchart of FIG. 6, the operation will be described in which the determining unit 17 determines occurrence of knock on the basis of the number c counted by the counter 16.

In step a1, the number c counted by the counter 16 is initialized to zero. In step a2, the observation period which is set in a cycle of the internal combustion engine 11 is started in response to the output of the crank angle sensor 13. In step a3, it is judged whether the detection output of the knock sensor 12 that has passed through the BPF 14 in which the filtering frequency band is set reaches the determination level 44 set in the level discriminating unit 15 or not. If the judgment is yes, the control proceeds to step a4, and, if no, the control proceeds to step a5.

In step a4, the detection output of the knock sensor 12 which reaches the determination level 44 or more is counted by the counter 16, and the counted number or one is added to the number c which has been set. The number c which is the result of the addition is replaced as a new number c. In step a5, it is judged whether the preset observation period is ended or not. If the judgment is yes, the control proceeds to step a6, and, if no, the control returns to step a3 to repeat the subsequent steps.

In step a6, it is judged whether or not the number c of times at which the detection output of the knock sensor 12 that is extracted during the observation period reaches the determination level 44 or more is equal to or smaller than the given value x2 or, for example, one as described above. If the judgment is yes, the control proceeds to step a9, and, if no, the control proceeds to step a7. In step a9, since the number c is equal to or smaller than the given value x2, it is determined that knock does not occur.

In step a7, it is judged whether the number c is equal to or larger than the given value x1 or, for example, five as described above or not. If the judgment is yes, the control proceeds to step a10, and, if no, the control proceeds to step a8. In step a8, since the number c exceeds the given value x2 and is smaller than the given value x1, it is determined that knock occurs. In step a10, since the number c is equal to or larger than the given value x1, the determining unit 17 determines that determination of occurrence of knock is impossible, and outputs the result of the determination. In step a11, in response to the output of the determining unit 17 that determination of occurrence of knock is impossible, the correcting unit 18 or the wide correcting unit 22 performs the correction of shifting the filtering frequency band of the BPF 14 (hereinafter, the band is often referred to merely as the filtering frequency band).

In this way, the determination of deviation of the resonance frequency can be performed by the simple configuration for comparing the number c counted by the counter to check whether it is equal to or larger than the given value x1 or not, and whether it is equal to or smaller than the given value x2 or not. Furthermore, in response to the output of the determining unit 17, the correction of the filtering frequency band can be conducted by shifting the band so as to conform to the resonance frequency of knock. Therefore, the accuracy of knock detection can be improved.

Figure 7:
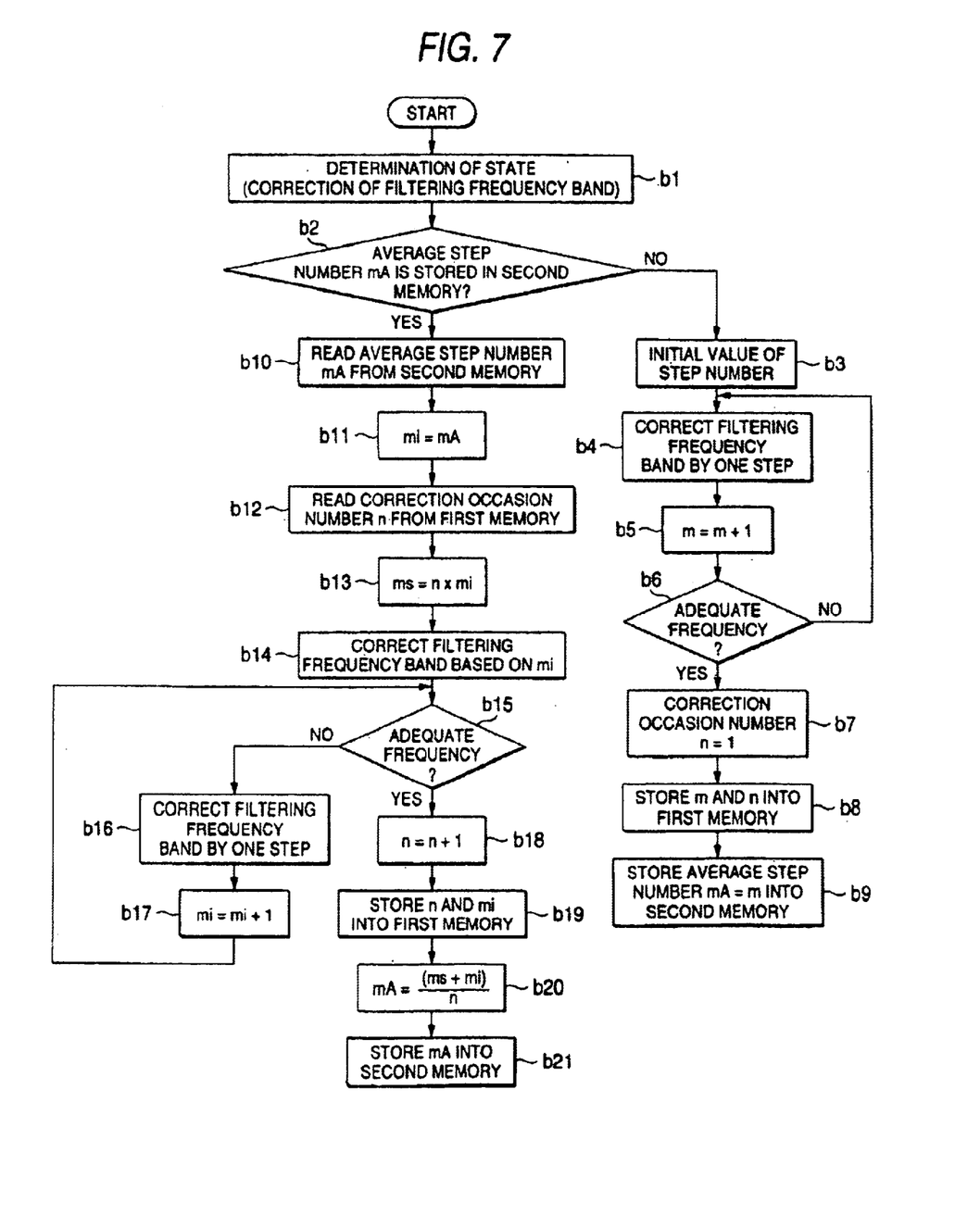
FIG. 7 is a flowchart showing an operation in which a correcting unit 18 or a wide correcting unit 22 corrects deviation of the filtering frequency band.

FIG. 7 is a flowchart showing the operation in which the correcting unit 18 or the wide correcting unit 22 corrects deviation of the filtering frequency band. With reference to the flowchart of FIG. 7, the operation will be described in which, in response to the output of the determining unit 17 that determination of occurrence of knock is impossible, the correcting unit 18 or the wide correcting unit 22 performs correction of shifting the filtering frequency band.

In step b1, during operation of the internal combustion engine 11, a state where correction of the filtering frequency band is required is determined. Namely, the state is the first cycle after the determination of the determining unit 17 is changed from the operation state where knock occurs or that where knock does not occur, to that where determination of occurrence of knock is impossible and the filtering frequency band is to be corrected. In step b2, it is judged whether an average step number mA is stored in the second memory 21 or not. If the judgment is yes, the control proceeds to step b10, and, if no, the control proceeds to step b3.

In steps subsequent to step b3, the correcting unit 18 performs correction in which the filtering frequency band is corrected stepwise or step by step, since the average step number mA is not stored in the second memory 21. In step b3, the step number m is initialized to zero.

In step b4, the filtering frequency band is corrected by one step. The set value of one step is not particularly limited. For example, 0.1 kHz may be set as the pitch of one step, and the correction of shifting the frequency band may be set so that the shifting is conducted in a direction along which the frequency is raised. In step b5, since the correction of shifting the filtering frequency band by one step has been conducted, the step number m is replaced with (m+1).

In step b6, the determination according to the flowchart shown in FIG. 6 is performed after the correction of shifting the filtering frequency band by one step, to judge whether the state where the number of times at which the detection output of the knock sensor 12 observed in the corrected filtering frequency band reaches the determination level or more is smaller than the given value x1 and the determination of occurrence or nonoccurrence of knock is enabled (hereinafter, the filtering frequency band in this state is often referred to as the adequate frequency) is attained or not. Specifically, after the determination of the determining unit 17 is changed from the operation state where knock occurs or that where knock does not occur, to that where determination of occurrence of knock is impossible and the filtering frequency band is to be corrected, the determination operation of the determining unit 17 shown in FIG. 6 and for the second and subsequent cycles is performed in step b6. If the judgment of step b6 is no, the control is returned to step b4 to perform correction of further shifting the filtering frequency band by one step, and then transferred to the next cycle to perform the determination operation of the determining unit 17 shown in FIG. 6.

If the judgment of step b6 is yes, the control proceeds to step b7. In step b7, the number n of occasions in which the filtering frequency band is corrected is set to one (hereinafter, the number is referred to as the correction occasion number). The correction occasion number n is counted in the following manner. When, after the determination of the determining unit 17 is changed from the operation state where knock occurs or that where knock does not occur, to that where determination of occurrence of knock is impossible, the correction of stepwise shifting the filtering frequency band is performed and the state is returned to that where knock occurs or that where knock does not occur, the occasion of the correction of the filtering frequency band counts as one. At this time, the average step number mA is not stored in the second memory 21. Therefore, it is considered that, after the start of operation of the internal combustion engine 11, the correction of shifting the filtering frequency band has not yet been conducted, and the occasion is the first occasion of correcting the filtering frequency band after the start of operation. As a result, the correction occasion number n is set to one as described above.

In step b8, the actual step number m at which the correction of shifting the filtering frequency band is conducted, and the correction occasion number n are stored into the first memory 19. In step b9, the average step number mA is stored into the second memory 21. Since the correction occasion number n is one, the average step number mA is equal to the step number m, and hence the average step number mA is replaced with the step number m and then stored into the second memory 21.

As described above, if the judgment of step b2 is yes, the control proceeds to step b10. In step b10, the average step number mA stored in the second memory 21 is read out. In step b11, mi which indicates the number of correction steps to be performed in an i-th correction occasion is replaced with the average step number mA. In step b12, the correction occasion number n read out from the first memory 19.

The correction occasion number n means the number of corrections which have been conducted n times before the present correction of shifting the filtering frequency band is conducted, and is stored into the first memory 19 each time when the correction is completed. In step b13, the calculating unit 20 calculates the sum ms (=n×mi) of steps of shifting the filtering frequency band in the n number of correction occasions. In step b14, in response to the output of the processing circuit 25 which serves as the wide correcting unit 22, the filtering frequency band of the BPF 14 is corrected at one stroke by the degree corresponding to the step number mi, for example, (0.1×mi) kHz in the case where the pitch of one step is 0.1 kHz.

In step b15, after the filtering frequency band is corrected at one stroke by the degree corresponding to the step number mi, determination is performed in accordance with the flowchart shown in FIG. 6 to judge whether the corrected filtering frequency band is the adequate frequency or not. Namely, in the same manner as step b6 described above, after the determination of the determining unit 17 is changed from the operation state where knock occurs or that where knock does not occur, to that where determination of occurrence of knock is impossible and the filtering frequency band is to be corrected, the determination operation of the determining unit 17 shown in FIG. 6 and for the second and subsequent cycles is performed in step b15. If the judgment of step b15 is no, the control returns to step b16, and, if the judgment is yes, the control proceeds to step b18.

In step b16, the correction of further shifting the filtering frequency band by one step is conducted. In step b17, since the correction of shifting the filtering frequency band by one step is conducted in step b16, the calculating unit 20 adds one to the step number mi, and the new step number is replaced with (mi+1). Then, the control returns to step b15 to be transferred to the next cycle of the internal combustion engine 11, and the determination operation of the determining unit 17 shown in FIG. 6 is performed.

In step b18, one is added to the correction occasion number n, and the new correction occasion number n is replaced with (n+1). In step b19, the correction occasion number n, and the actual step number mi at which the correction of shifting the filtering frequency band is conducted are stored into the first memory 19. In step b20, the calculating unit 20 calculates the average step number mA by following Expression (1):

$$mA=(mS+mi)/n \tag{1}$$

In step b21, the average step number mA is stored into the second memory 21. The average step number mA which is obtained in accordance with the flowchart of FIG. 7 is stored into the second memory 21 for each of the cylinders 23 of the internal combustion engine 11, and for each of rotational speeds of the internal combustion engine 11.

The apparatus may be configured so that the correction occasion number n and the step number mi which are stored in the first memory 19, and the average step number mA which is stored in the second memory 21 are erased each time when the operation of the internal combustion engine 11 is stopped, or, for example, when the ignition switch of a vehicle on which is the internal combustion engine 11 is mounted is turned off. Alternatively, the apparatus may be configured so that the numbers are not erased but accumulated so as to be used in judgment of occurrence of knock.

In the embodiment, the average step number mA is stored in the second memory 21, and the wide correcting unit 22 can conduct the correction of performing the one-stroke shifting of steps which are decided by the average step number mA, and by which the given filtering frequency band of the BPF 14 is to be shifted. Therefore, the time period required for the correction of the resonance frequency band can be shortened, and occurrence of knock can be rapidly determined. The average step number mA is stored in the second memory 21 for each of the cylinders of the internal combustion engine 11, and for each of the rotational speeds of the internal combustion engine 11. Therefore, for each of the cylinders, and in a state where the rotational speed is changed, the wide correcting unit 22 can conduct the correction of performing the one-stroke shifting of steps which are decided by the average step number mA, and by which the filtering frequency band of the BPF 14 is to be shifted.

As described above, in the embodiment, the nock determining apparatus 10 is configured so as to include the wide correcting unit 22. However, the apparatus of the invention is not restricted to this, and may be configured so as not to include the wide correcting unit 22.

According to the invention, the determining unit determines deviation of the resonance frequency of knock on the basis of the number c which is a counted number of detection outputs of the knock sensor that are equal to or higher than the given determination level, and the correcting unit conducts correction of shifting the filtering frequency band of the filter in response to the output of the determining unit. According to the configuration, deviation of the resonance frequency can be determined by the simple configuration, and correction of the filtering frequency band of the filter can be conducted by shifting the band so as to conform to the resonance frequency of knock. Therefore, the accuracy of knock detection can be improved.

According to the invention, the determining unit determines whether knock occurs or not, or whether determination of occurrence of knock is impossible or not, on the basis of a result of the comparison of whether the number c counted by the counter is equal to or larger than the given value x1 or not, or a result of the comparison of whether the number is equal to or smaller than the given value x2 or not. According to the configuration, occurrence of knock and deviation of the resonance frequency can be determined by the simple configuration, and erroneous determination of occurrence of knock can be reduced. Therefore, the control of suppressing knock can be conducted more accurately.

According to the invention, since the wide correcting unit can conduct the correction of performing the one-stroke shifting of steps which are decided by the average step number, and by which the filtering frequency band of the filter is to be shifted, the time period required for the correction of the filtering frequency band can be shortened, and occurrence of knock can be rapidly determined.

According to the invention, the average step number is stored in the second memory for each of cylinders of the internal combustion engine, and for each of rotational speeds of the internal combustion engine. According to the configuration, for any one of cylinders of the internal combustion engine, and in a state where the rotational speed of the internal combustion engine is changed, the wide correcting unit can conduct the correction of performing the one-stroke shifting of steps which are decided by the average step number, and by which the filtering frequency band of the filter is to be shifted. Therefore, the time period required for the correction of the filtering frequency band can be further shortened.

What is claimed is:

1. A knock determining apparatus for an internal combustion engine, comprising:

a knock sensor for detecting knock in the internal combustion engine;

a crank angle sensor for detecting a rotational angular position of a crank disposed in the internal combustion engine;

a filter in which a filtering frequency band is variable, the filter for filtering a detection output of the knock sensor;

a level discriminating unit for discriminating an output of the filter with respect to a given determination level in response to the output of the filter;

a counter for counting number c of times at which the detection output of the knock sensor is not lower than the determination level in response to an output of the level discriminating unit;

a determining unit for determining whether knock occurs or not on a basis of the counted number c in response to an output of the counter; and a correcting unit, in response to an output of said determining unit, for shifting the filtering frequency band of the filter when it is determined that determination of occurrence of knock is impossible.

2. The knock determining apparatus according to claim 1, wherein when the number c counted by the counter is not lower than a given first value x1, the determining unit determines that determination of occurrence of knock is impossible;

wherein when the number c is not higher than a given second value x2, the determining unit determines that knock does not occur.

3. The knock determining apparatus according to claim 1, further comprising:

a first memory for storing step number at which the filtering frequency band of the filter is stepwise shifted to enable determination of occurrence of knock in response to an output of the correcting unit;

a calculating unit for calculating a sum of the step numbers stored in the first memory and average step number by dividing the sum of step numbers by a number of occasions where the correcting operation of stepwise shifting the filtering frequency band of the filter is performed on a basis of determination that determination of occurrence of knock is impossible;

a second memory for storing the average step number, which is a calculation result, in response to an output of the calculating unit; and a wide correcting unit for performing a one-stroke shifting of steps, which is decided by the average step number read out from the second memory, in response to the output of the determining unit, when it is determined that determination of occurrence of knock is impossible and the average step number is stored in the second memory, wherein the correcting unit stepwise shifts the filtering frequency band of the filter.

4. The knock determining apparatus according to claim 3, wherein the second memory stores the average step number for each of cylinders of the internal combustion engine and for each of rotational speeds of the internal combustion engine.

5. A knock determining apparatus for an internal combustion engine, comprising:

a knock sensor for detecting knock in the internal combustion engine;

a crank angle sensor for detecting a rotational angular position of a crank disposed in the internal combustion engine;

a filter in which a filtering frequency band is variable, the filter for filtering a detection output of the knock sensor;

level discriminating means for discriminating an output of the filter with respect to a given determination level in response to the output of the filter;

a counter for counting number c of times at which the detection output of the knock sensor is not lower than the determination level in response to an output of the level discriminating means;

determining means for determining whether knock occurs or not on a basis of the counted number c in response to an output of the counter; and correcting means, in response to an output of said determining means, for shifting the filtering frequency band of the filter when it is determined that determination of occurrence of knock is impossible.

6. The knock determining apparatus according to claim 5, wherein when the number c counted by the counter is not lower than a given first value $x1$, the determining means determines that determination of occurrence of knock is impossible;

wherein when the number c is not higher than a given second value $x2$, the determining means determines that knock does not occur.

7. The knock determining apparatus according to claim 5, further comprising:

a first memory for storing step number at which the filtering frequency band of the filter is stepwise shifted to enable determination of occurrence of knock in response to an output of the correcting means;

calculating means for calculating a sum of the step numbers stored in the first memory and average step number by dividing the sum of step numbers by a number of occasions where the correcting operation of stepwise shifting the filtering frequency band of the filter is performed on a basis of determination that determination of occurrence of knock is impossible;

a second memory for storing the average step number, which is a calculation result, in response to an output of the calculating means; and wide correcting means for performing a one-stroke shifting of steps, which is decided by the average step number read out from the second memory, in response to the output of the determining means, when it is determined that determination of occurrence of knock is impossible and the average step number is stored in the second memory, wherein the correcting means stepwise shifts the filtering frequency band of the filter.

8. The knock determining apparatus according to claim 7, wherein the second memory stores the average step number for each of cylinders of the internal combustion engine and for each of rotational speeds of the internal combustion engine.

9. A knock determining apparatus for an internal combustion engine, comprising:

a knock sensor for detecting knock in the internal combustion engine;

a crank angle sensor for detecting a rotational angular position of a crank disposed in the internal combustion engine;

a filter in which a filtering frequency band is variable, the filter for filtering a detection output of the knock sensor;

a level discriminating unit for discriminating an output of the filter with respect to a given determination level in response to the output of the filter;

a counter for counting number c of times at which the detection output of the knock sensor is not lower than the determination level in response to an output of the level discriminating unit;

a determining unit for determining whether knock occurs or not on a basis of the counted number c in response to an output of the counter; and a correcting unit, in response to an output of said determining unit, for shifting the filtering frequency band of the filter, based on the occurrence of knocks.

* * * * *